(No Model.) 2 Sheets—Sheet 2.

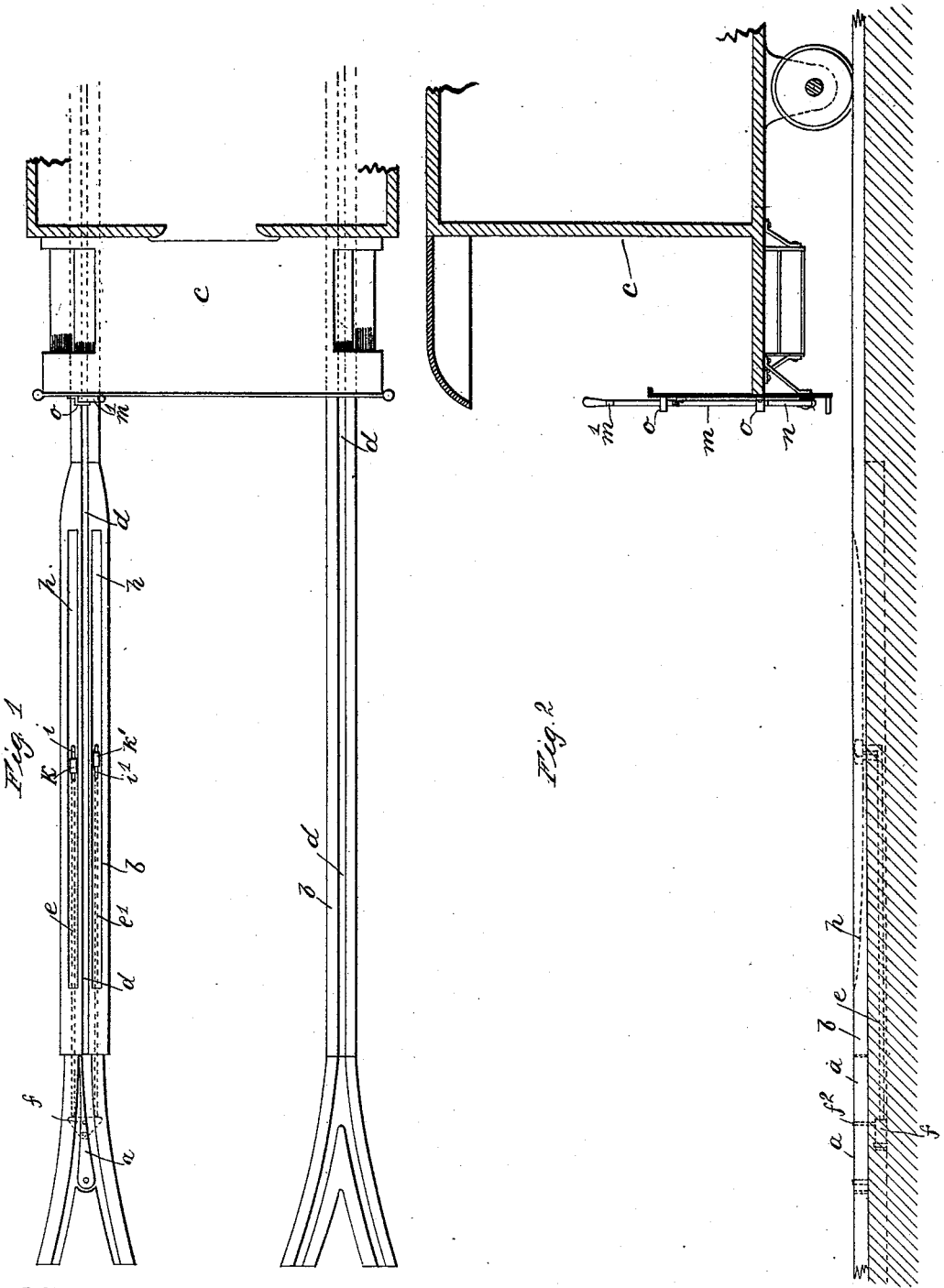

J. O'MARRA.
AUTOMATIC SWITCH.

No. 495,227. Patented Apr. 11, 1893.

Witnesses
V. T. Wilson
Fred S. Kemper

Inventor
John O'Marra
By his Attorneys
Gifford & Law

UNITED STATES PATENT OFFICE.

JOHN O'MARRA, OF NEW YORK, N. Y., ASSIGNOR OF ONE-THIRD TO ARTHUR C. BUTTS, OF SAME PLACE.

AUTOMATIC SWITCH.

SPECIFICATION forming part of Letters Patent No. 495,227, dated April 11, 1893.

Application filed March 15, 1892. Serial No. 424,971. (No model.)

*To all whom it may concern:*

Be it known that I, JOHN O'MARRA, of New York, in the county and State of New York, have invented a new and useful Improvement in Automatic Switches for Railways, of which the following is a specification.

My improvement relates to tramways and other street railways, and is especially designed for use on cable and electric roads, where the switch must be operated from the car, and where, on account of the conduit for the cable, the switch operating mechanism must be near the surface of the street.

Figure 5:
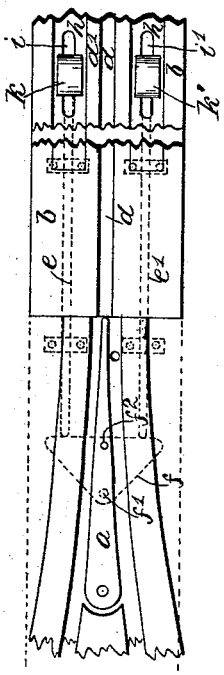
Figure 6:
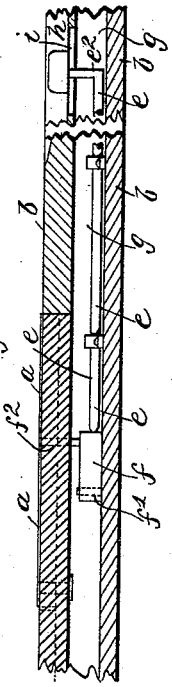
Figure 7:
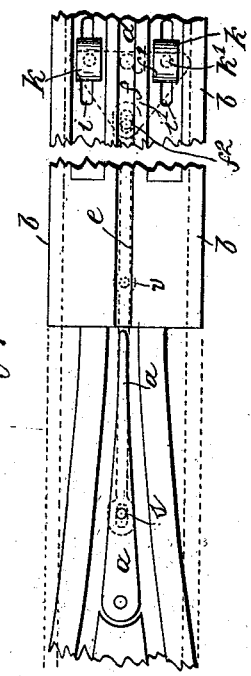
Figure 4:
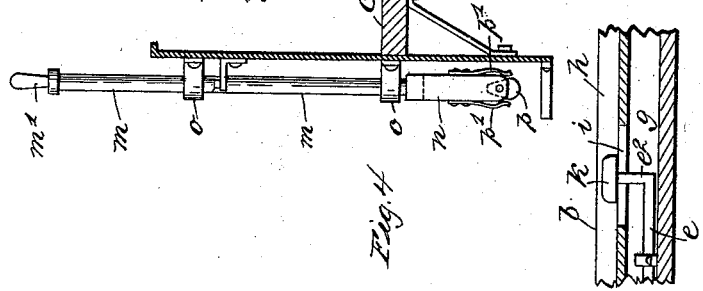
Figure 3:
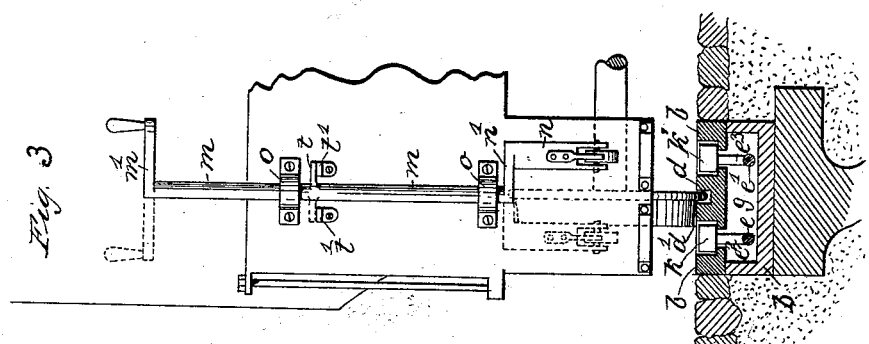

In the accompanying drawings illustrating my improvement, Figure 1 is a plan view of a section of the road with my improved switch. Fig. 2 is a side elevation of the track and end of a car in section. Fig. 3 is an end elevation of the track connected with the switch and of a portion of the car showing the mechanism on the same for operating the switch. Fig. 4 is a side elevation. Fig. 5 is a plan view of the switch and track. Fig. 6 is a side elevation of the same and Fig. 7 is a modification.
$a$ is the switch tongue.

$b$ and $b'$ are the tracks which, in the construction shown in the drawings, have a groove $d$ for the flange of the car wheel, the tread $d'$ of the rail being even or flush with the surface of the street. $c$ is the car.

The switch is controlled and operated by rods $e$ and $e'$ extending out in front of the same parallel with the track and terminating in blocks $k$ and $k'$ which are moved by a projection from the front of the car. The inner ends of these rods $e$ and $e'$, or the ends next to the switch tongue, rest or abut against a triangular piece $f$ pivoted at $f'$ to a plate or suitable framework beneath the track so as to turn on the same and connected by the pin $f^2$ to the switch tongue above. As one or the other of the rods $e$ or $e'$ slide in toward the switch, it presses against the piece $f$ thereby causing the latter to turn in one direction or the other and thus by means of the pin $f^2$ swinging the switch tongue around in the same direction. The rods $e$ and $e'$ are contained and move within the rail or track $b$ and on each side of the wheel tread $d'$ and flange groove $d$. This rail which is con- structed especially for the purpose, is formed with a central cavity $g$ within which the rods $e$ and $e'$ lie. On top of the rail on each side of the central wheel-tread and groove, are longitudinal grooves $h$ and $h'$, and near the center of each groove or slots $i$ and $i'$ extending down into the central cavity $g$. Through these slots project the posts $e^2$ and $e^3$ connected respectively with the rods $e$ and $e'$, and on the outer end of each post are the blocks $k$ and $k'$. These blocks $k$ and $k'$ are of a size to completely fill the grooves $h$ and $h'$ and yet readily move within the same. As the blocks are moved back and forth within the groove, they cause the rods $e$ and $e'$ to slide in a corresponding direction and thus turn the switch tongue; the slots $i$ and $i'$ being long enough to insure the rods moving a sufficient distance to completely turn the switch tongue. The grooves $h$ and $h'$ in the rail are made very narrow to prevent the wheel of any vehicle entering the same, and as the blocks $k$ and $k'$ do not project above the rail they cannot be interfered with or moved by anything passing on the street.

The blocks $k$ and $k'$ are moved by a device on the front end of the car. This consists of a rod $m$ secured to the dashboard of the car by the straps or eyes $o$ $o$ so as to slide and turn within the same. At the lower end of the rod $m$ is a piece $n$ connected to the rod by the arm $n'$ and at the top of the rod is a handle $m'$ extending from the rod in the same direction as the arm. It will be evident that as the handle is turned the lower piece $n$ is turned in the same direction. The rod $m$ is attached to the car in such a position and the arm $n'$ is of such a length that when the piece $n$ is turned back in either direction against the dashboard it will be directly over the groove $h$ or $h'$ and consequently in line with the block $k$ or $k'$, and hence when the rod $m$ is lowered the end of the piece $n$ will enter the groove and strike against the projecting block $k$ or $k'$ and move the same.

At the lower end of the piece $n$ is a curved projection $p$ pivoted to the piece so as to move in either direction and held in place by the springs $p'$. This projection forms a yielding end whereby the piece $n$ can readily pass over the blocks $k$ and $k'$ as the car moves along. On the rod $m$ is a projection $t$ which rests on the supports $t'$ when the rod is to be held up out of engagement with the switch mechanism.

The operation of my improvement is as follows: The blocks $k$ and $k'$ are placed some distance in front of the switch so that the latter can be turned before the car reaches it. As the car approaches the switch the driver turns the rod $m$ so as to bring the piece $n$ in line with either the block $k$ or $k'$ according as he desires to turn the switch in one direction or the other, and when the car has reached the grooves $h$ and $h'$ the rod is pushed down until the projection $p$ enters the groove and passing along the same strikes the block and moving the latter turns the switch in the direction desired.

In the modification shown in Fig. 7, the triangular piece $f$ is connected directly with the blocks $k$ and $k'$, and there is a single rod or lever $e$ pivoted to the bottom of the rail at $v$ and connected at either end to the piece $f$ and switch tongue $a$. As the blocks are moved, the triangular piece $f$ is turned and by means of the lever $e$ turns the switch in a corresponding direction.

I claim—

1. In a switch for railways, in combination the switch tongue $a$, rail $b$ having the grooves $h\ h'$, blocks $k\ k'$ moving in the grooves, mechanism connecting the blocks and switch whereby as the blocks are moved the switch is turned, and mechanism on the car adapted to be brought into engagement with the blocks, substantially as described.

2. In combination the switch, a block, mechanism on the car adapted to engage with the block, mechanism for connecting the block and switch whereby as the block is moved the switch is turned and a rail provided with a chamber containing the mechanism connecting the block and switch, substantially as described.

3. In a switch for railways, in combination the switch $a$, piece $f$ connected to the switch tongue and arranged to turn the latter, rods $e$ and $e'$ having one end resting against the piece $f$ and provided at the other end with the blocks $k$ and $k'$ and contained and moving in the rail $b$, the rail $b$ provided with the grooves $h\ h'$ and slots $i\ i'$ and mechanism on the car adapted to be brought into engagement with the blocks $k\ k'$, substantially as described.

4. In a switch for railways, in combination the switch $a$, member $f$ connected to the switch tongue and arranged to turn the same, rods $e$ and $e'$ having the projecting blocks $k$ and $k'$ contained and moving in the rail $b$, rail $b$ provided with the grooves $h\ h'$ and slots $i\ i'$ and a device upon the car to be brought into contact with the blocks $k\ k'$ to actuate the same, substantially as described.

JOHN O'MARRA.

Witnesses:
　JAMES T. PLACE,
　V. T. WILSON.